United States Patent
Gacek et al.

(10) Patent No.: US 6,575,470 B1
(45) Date of Patent: Jun. 10, 2003

(54) NON-CONTACTING FACE SEALS

(75) Inventors: Antoni Gacek, Kozy (PL); Jan Wawak, Bielsko-Biala (PL); Jaroslaw Lasek, Bielsko-Biala (PL); Zbigniew Okrzeszowski, Pisarzowice (PL); Stefan Kuder, Janowice (PL)

(73) Assignee: "ANGA" Uszczelnienia Mechanicznespokazoo, Kozy (PL)

( * ) Notice: Subject to any disclaimer, the term of this patent is extended or adjusted under 35 U.S.C. 154(b) by 0 days.

(21) Appl. No.: 09/857,541

(22) PCT Filed: Jul. 6, 1999

(86) PCT No.: PCT/PL99/00023

§ 371 (c)(1),
(2), (4) Date: Jun. 5, 2001

(87) PCT Pub. No.: WO00/34697

PCT Pub. Date: Jun. 15, 2000

(30) Foreign Application Priority Data

Dec. 10, 1998 (PL) .................................................. P330259

(51) Int. Cl.$^7$ ................................................. F16J 15/34
(52) U.S. Cl. ...................................... 277/399; 277/408
(58) Field of Search ................................. 277/399, 400, 277/401, 403, 408, 418

(56) References Cited

U.S. PATENT DOCUMENTS

| 4,836,561 A | * | 6/1989 | Lebeck et al. ............... 277/400 |
|---|---|---|---|
| 5,092,612 A | * | 3/1992 | Victor et al. ................. 277/400 |
| 5,496,047 A | * | 3/1996 | Goldswain et al. .......... 277/400 |
| 5,556,111 A | * | 9/1996 | Sedy ............................ 277/400 |
| 5,834,094 A | * | 11/1998 | Etsion et al. ................. 277/301 |
| 5,947,481 A | * | 9/1999 | Young ......................... 277/399 |
| 6,142,478 A | * | 11/2000 | Pecht et al. .................. 277/400 |
| 6,189,896 B1 | * | 2/2001 | Dickey et al. ............... 277/399 |

FOREIGN PATENT DOCUMENTS

| EP | 0 369 295 A | 5/1990 | ............ F16J/15/34 |
|---|---|---|---|
| EP | 0 637 706 A | 2/1995 | ............ F16J/15/34 |

* cited by examiner

Primary Examiner—Anthony Knight
Assistant Examiner—Vishal Patel

(57) ABSTRACT

Non-contacting face seals having sliding rings with grooves formed in the lateral planes thereof. Each groove has inlet and outlet ends, with the traverse cross-section of the groove decreasing from the inlet end to the outlet end. The outlet end of the groove defines a recess of approximately 7 microns in the lateral plane. The bottom surface of the groove curves longitudinally and transversely, with a maximum curvature of about 4 microns. The lateral edges of the groove are of different lengths, so that one extends farther from the plane of the sliding rings than the other. The grooves have a variety of shapes, including spiral, double crossed spiral, and others. The seals help maintain high accuracy and dimensional repeatability of the grooves in the sliding rings for industrial and manufacturing applications.

6 Claims, 2 Drawing Sheets

NON-CONTACTING FACE SEALS

A common mechanical not-contacting face seal knew so far according to a German patent descriptions nr 3722303 has get a sliding ring which possesses on the face surface spiral grooves of a transverse section diminishing from its start towards the inner end, and at the same time at the very inner end of each groove the surface of the section as well as the depth of the curve equal zero. The bottom of the groove runs alongside the lateral-working surface of a sliding ring.

Non-contacting face seals, according to the invention, possess the sliding rings with grooves which have at the end a recess to the lateral plane of sliding rings amounting to approx. 7 $\mu$m, while the surface of the groove bottoms longitudinal section runs alongside the curve of a max. increase of approx. 4 $\mu$m, and in transverse section of the grooves the surface of the bottom runs also alongside the curve of the increase of approx. 4 $\mu$m however in this transverse section both lateral edges of the bottom, are parted from the lateral plane of sliding rings by the depth, one of which is more dimensionally distant from the lateral plane of sliding rings that the second depth and the bigger depth equals up to 7 $\mu$m. Geometry of the grooves of the sliding rings in transverse and longitudinal sections is constructionally connected with the shape: known in the nature of one way spiral grooves, double crossed spiral grooves, X-shaped single crossed spiral grooves, spiral grooves set in the form of the letter A oriented in the direction forward middle part of sliding rings, as well as connected constructionally with grooves which from the view are the lateral plane of the sliding rings have the shape of surfaces limited by $\Omega$ letter shape.

The seals in question enable less labour consuming manufacturing of sliding rings on machines of simple construction than an specialised grinders or laser machine tools, maintaining high accuracy and dimensional repeatability of all grooves in given sliding rings.

Figure 1:
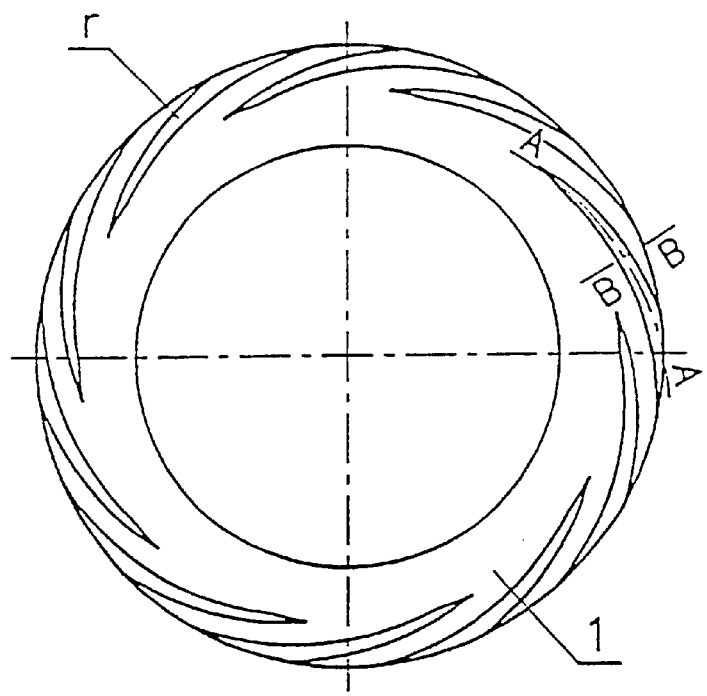
Figure 6:
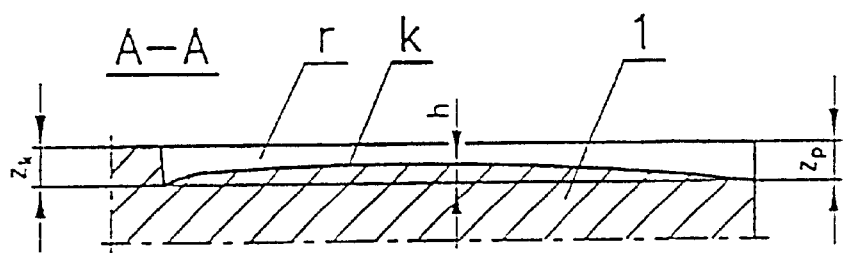
Figure 7:
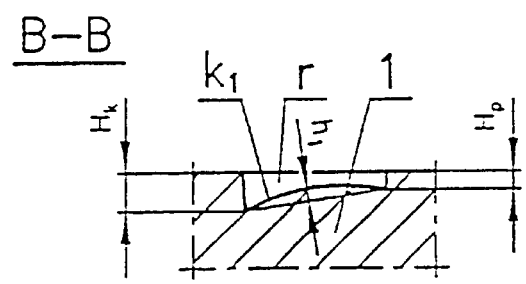
Figure 2:
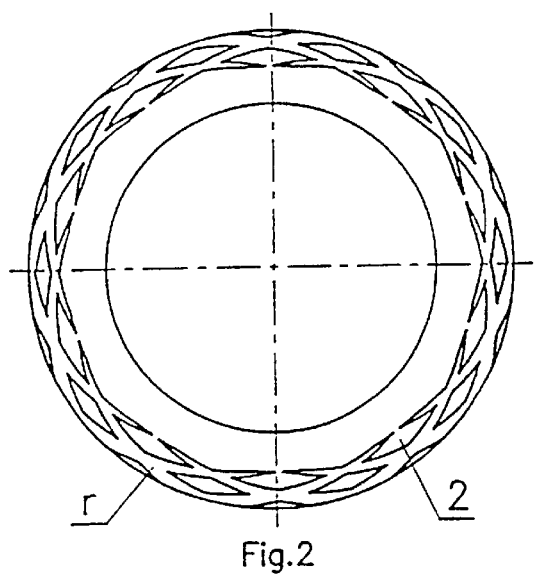
Figure 4:
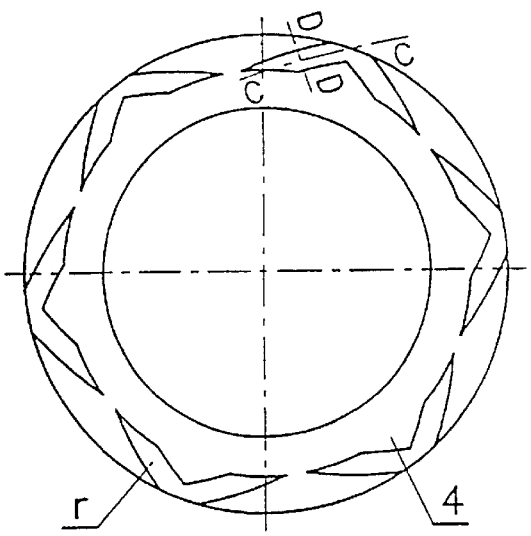
Figure 3:
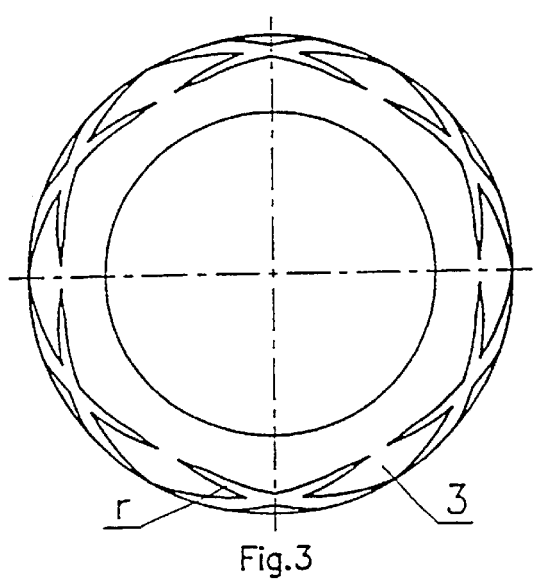
Figure 5:
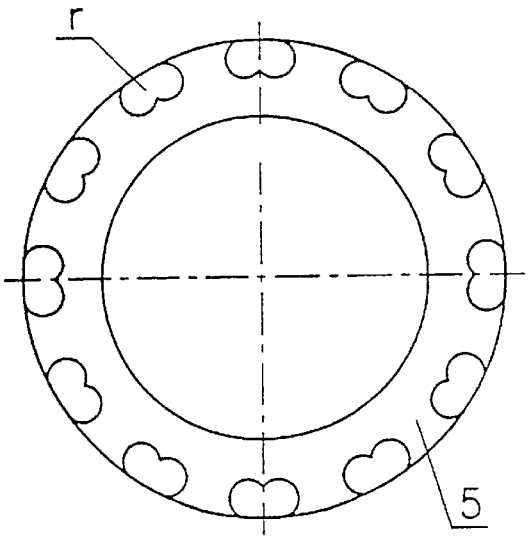
Figure 8:
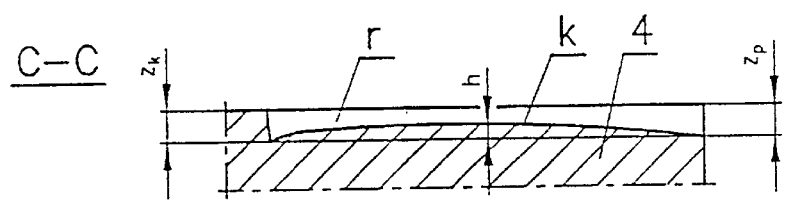
Figure 9:
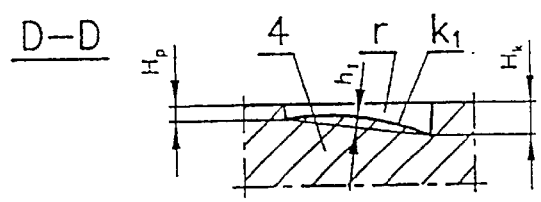

The object of the invention in manufactured examples is presented on drawings and FIG. 1 shows the face view of a sliding ring with one way spiral grooves, FIG. 2 —face view of a ring with double crossed spiral grooves, FIG. 3 —face view of a sliding ring with X-shaped single crossed spiral grooves, FIG. 4 —face view of sliding ring with A-shaped spiral grooves, FIG. 5 —face view of sliding ring with grooves of $\Omega$-letter shape, FIG. 6 —longitudinal section A—A through a sliding ring groove 1 from FIG. 1, FIG. 7 —transverse section B—B through a sliding ring groove 1 from FIG. 1, FIG. 8 —longitudinal section C—C through the sliding ring groove 4 from FIG. 4 and FIG. 9 —transverse section D—D through the sliding ring groove 4 from FIG. 4.

Seals according to the invention have sliding rings 1, 2, 3, 4 and 5 with grooves r, which have recess Zk at the end outlet, with reference to the lateral plan e of sliding rings 1, 2, 3, 4 and 5 of 7 $\mu$m. And in longitudinal section the initial hollow Zp is bigger than the final hollow Zk, and the surface of grooves bottoms r in these longitudinal sections runs alongside the curve K of h increase not bigger than 4 $\mu$m. In transverse sections of grooves r the surface of the groove bottoms runs alongside curves K1 of $h_1$ increase not bigger than 4 $\mu$m, while in these transverse sections both lateral edges of groove bottoms are distant from lateral surfaces of sliding rings 1, 2, 3, 4 and 5 of the depth of Hp and Hk which depths Hk are more dimensionally distant from the lateral planes of sliding rings 1, 2, 3, 4 and 5 than the depths Kp, and those bigger depths Hk are within the limit of 7 $\mu$m.

Geometry of grooves r of sliding rings 1, 2, 3, 4 and 5 in transverse and longitudinal sections is constructionally connected with the shape: known in the nature of one way spiral grooves r shown in FIG. 1, double crossed spiral grooves r shown in FIG. 2, X-shaped single crossed spiral grooves r shown in FIG. 3, spiral grooves r composed in A-letter shape with hands directed towards the central part of a sliding ring 4, shown in FIG. 4, as well as the above mentioned geometry is connected in construction with grooves r, which from the view on a lateral plane of a sliding ring 5 have $\Omega$-letter shaped surface.

The object of the invention, apart from the given examples of construction, can be used in non-contacting mechanical face seals with sliding ring with differently shaped in the outer view of grooves r.

What is claimed is:

1. Non-contact mechanical face seals comprising sliding rings (1–5) having grooves (r) formed in the lateral planes thereof, each said groove (r) having an inlet end and an outlet end a transverse cross-section decreasing from the inlet end toward the outlet end, the groove (r) having a recess ($Z_k$) with respect to the lateral plane of approximately 7 $\mu$m at the outlet end, the surface of the bottom of the groove (r) in its longitudinal direction running alongside a curve (k) having a maximum increase in height of up to approximately 4 $\mu$m, while the surface of the bottom of the groove (r) in its transverse direction runs alongside a curve ($k_1$) between lateral edges of the bottom of the groove with a maximum increase in height of up to approximately 4 $\mu$m, the lateral edges of the bottom of the grooves being distant from the lateral plane of the ring by respective values of depth ($H_k$, $H_p$), wherein one ($H_k$) of the values of depths of said lateral edges is greater than the other ($H_p$) and is up to 7 $\mu$m.

2. Non-contact mechanical face seals, according to claim 1, are characterised by the fact that the geometry of the grooves (r) of sliding rings (1) in transverse and longitudinal sections is constructionally connected with the shape of known in nature one way spiral grooves (r).

3. Non-contact mechanical face seals, according to claim 1, are characterised by the fact that the geometry of the grooves (r) of sliding rings (2) is constructionally connected with double crossed spiral grooves (r).

4. Non-contact mechanical face seals, according to claim 1, are characterised by the fact that the geometry of sliding rings (3) is constructionally connected with X-shaped single crossed spiral grooves (r).

5. Non-contact mechanical face seals, according to claim 1, are characterised by the fact that the geometry of grooves (r) of sliding rings (4) is constructionally connected with spiral grooves (r) set in lateral plane of the sliding rings (4) in the shape of A-letter with hands directed towards the central part of sliding rings (4).

6. Non-contact mechanical face seals, according to claim 1, is characterized by the fact that the geometry of the grooves (r) of sliding rings (5) is constructionally connected with the grooves (r), which from the view on the lateral plane of sliding rings (5) have the shape of the letter $\Omega$.

* * * * *